United States Patent [19]
Borsboom et al.

[11] Patent Number: 5,322,158
[45] Date of Patent: Jun. 21, 1994

[54] COMB-SHAPED ELEMENT FOR RECEIVING PRODUCTS SUPPLIED BY A CONVEYING MAT

[75] Inventors: W. A. Borsboom, Leidschendam; C. P. J. M. Vermeulen, Rotterdam, both of Netherlands

[73] Assignee: MCC Nederland B.V., Gravenzande, Netherlands

[21] Appl. No.: 139,405

[22] Filed: Oct. 19, 1993

[30] Foreign Application Priority Data

Oct. 19, 1992 [NL] Netherlands .......................... 9201813

[51] Int. Cl.$^5$ .............................................. B65G 47/74
[52] U.S. Cl. ...................................................... 198/635
[58] Field of Search ................. 198/324, 325, 600, 635

[56] References Cited

U.S. PATENT DOCUMENTS

| | | | |
|---|---|---|---|
| 2,016,104 | 10/1935 | Cooper et al. | 198/325 |
| 2,141,876 | 12/1938 | Perkins | 198/635 X |
| 2,237,345 | 4/1941 | Frentzel et al. | |
| 3,687,257 | 8/1972 | Johnson | 198/325 |
| 4,171,045 | 10/1979 | Lapeyre | 198/635 |
| 4,858,751 | 8/1989 | Hodlewsky | 198/325 X |
| 5,228,554 | 7/1993 | Kuchta et al. | 198/635 |

FOREIGN PATENT DOCUMENTS

| | | |
|---|---|---|
| 782008 | 4/1972 | Belgium . |
| 0161958 | 11/1985 | European Pat. Off. . |
| 523019 | 8/1976 | U.S.S.R. .............................. 198/325 |

*Primary Examiner*—D. Glenn Dayoan
*Attorney, Agent, or Firm*—Varnum, Riddering, Schmidt & Howlett

[57] ABSTRACT

Comb-shaped element for receiving products supplied by a conveying mat, which comb-shaped element is made of a body with an essentially closed top surface and a plurality of teeth formed on the body and extending parallel to each other, there being provided on the undersurface of the body of the comb-shaped element a first and a second hook-shaped element extending transversely to the longitudinal direction of the teeth and being capable of resiliently cooperating with an attachment element mounted on the frame of the conveyor so as to fixedly secure the comb-shaped element, while it can yet follow the movement of the conveying mat when it expands and further is readily exchangeable in the case of damage.

12 Claims, 2 Drawing Sheets

COMB-SHAPED ELEMENT FOR RECEIVING PRODUCTS SUPPLIED BY A CONVEYING MAT

BACKGROUND OF THE INVENTION

This invention relates to a comb-shaped element for receiving products supplied by a conveying mat of a conveyor, which comb-shaped element comprises a body with an essentially closed top surface and a plurality of teeth formed on the body and extending parallel to each other.

Such a comb-shaped element is disclosed, for instance, in U.S. Pat. No. 2,237,345 or in U.S. Pat. No. 4,051,949, which patent specifications describe an endless conveying mat preferably made up of synthetic plastics modules, wherein at the "end" of the mat, i.e., where it has been passed around driving wheels arranged transversely to the direction of advancement, the toothed projections of the comb engage between the successive upright ribs of the modules to thereby obtain, for the benefit of the products conveyed over the mat, a flowing transition from the moving transport part, the mat, to a stationary transport part, the body or bearing surface of the comb.

The known comb-shaped elements are fixedly connected to a frame of the conveyor by means of, for instance, bolts and nuts. This entails a number of drawbacks. Firstly, for the known fastening means, openings are present in the top surface of the bearing surface of the comb-shaped element to receive these fastening means and to be able to secure them. These openings are easily soiled and cannot be properly cleaned, which is undesirable, particularly in the foodstuffs industry. Secondly, it happens regularly that a tooth of the comb-shaped element is bent, for instance because, in the case of glass transport, a fragment of glass gets stuck under a tooth and presses it upwards. Such a damaged comb-shaped element must be replaced, which, in the case of the known fastening means, is a rather time-consuming operation, in particular when the access openings for the fastening means as described above are soiled. The entire conveyor must be stopped during the replacement operation, which is economically unattractive. Thirdly, when the known fastening means are used, problems can arise in the case where the conveyor and the combs are exposed to large temperature fluctuations, such as for instance when such a conveyor is used in a pasteurizer, in particular when it is periodically disinfected. The fact is that if the chain mat expands or shrinks as a result of temperature changes, the driving wheels, which are mounted on a common shaft, can follow this movement of the mat when, as is disclosed in U.S. Pat. No. 3,724,285, only the central driving wheel is fixedly mounted on the shaft and the other wheels can shift over the shaft in lateral direction relative to this central wheel. The combs mounted fixedly on the frame, however, can follow the lateral displacement of the modules only to a limited extent, even when the holes for the attachment of the comb to the frame by means of bolts and nuts are slotted. This results in a forcing of the teeth in lateral direction, which is not beneficial to the useful life of the mat modules and the combs.

SUMMARY OF THE INVENTION

The object of the present invention is to provide a comb-shaped element for receiving products supplied by a chain mat, which element possesses none of the above-mentioned drawbacks and which nonetheless can be manufactured as easily as the known comb-shaped element, and which, in principle, need not have a higher cost price.

To that end, the present invention provides a comb-shaped element of the above-mentioned type, characterized in that on the undersurface of the body of the comb-shaped element, adjacent the end of the teeth that bounds the body, a stop element is provided and that a retaining element is provided opposite the stop element, likewise on the undersurface of the body, the stop element comprising a hook-shaped part extending transversely to the longitudinal direction of the teeth and the retaining element comprising a resilient element, the stop element and the retaining element being capable of resiliently cooperating with an attachment element mounted on the frame of the conveyor in order to secure the comb-shaped element to the frame.

According to the invention, the comb-shaped element is mounted on the frame by means of a "click-fit connection", which enables quick exchangeability in the case of damage to the comb, while further the comb, in a preferred embodiment to be described with reference to the drawing, is capable of shifting in lateral direction relative to the frame, so that no problems arise when the conveying mat shrinks or expands, because the combs can easily follow the movement resulting therefrom. Finally, the hook-shaped elements can be arranged entirely at the underside of the comb-shaped elements, so that the top surface need not exhibit any opening or the like.

According to a preferred embodiment, the stop element forms one whole with the comb-shaped element, which is preferably manufactured by injection molding. In that case this stop element is not resilient or hardly resilient. According to this embodiment, however, the opposite retaining element is resilient and, for instance, made of a resilient metal strip which is mounted separately on the underside of the comb-shaped element. It is also possible, for instance, to use as a retaining element a spring-biased pawl or the like. This provides the possibility of manufacturing the comb-shaped element from a rather brittle synthetic material, so that in particular the teeth of the comb-shaped element break off easily when a force perpendicular to the plane of the comb-shaped element is exerted on them. This provides the advantage in the transportation of glass that fragments of glass getting stuck under the teeth of the comb-shaped element can break one or more teeth at most from this comb-shaped element, which is less objectionable than a bent tooth, which constitutes an obstruction to unimpeded transportation of the products to be transported.

According to another embodiment, the stop element is also a non-resilient element forming one whole with the comb-shaped element, while the retaining element likewise forms one whole with the comb-shaped element. This provides the advantage that the comb-shaped element is as inexpensive as possible because it can be manufactured entirely from a relatively resilient synthetic plastic material in one injection molding operation, the rigidity of the first hook-shaped element being obtained by making it relatively solid.

Disengagement of the comb-shaped element during operation is altogether impossible because the non-resilient hook-shaped part of the stop element engages the attachment element more and more tightly according as more force is exerted on the teeth of the comb in the direction of transport. Removal of the comb-shaped element, however, is extremely simple by virtue of the resilience of the retaining element.

BRIEF DESCRIPTION OF THE DRAWING

The present invention will be further described on the basis of an exemplary embodiment with reference to the drawing, wherein.

DETAILED DESCRIPTION

Figure 1:
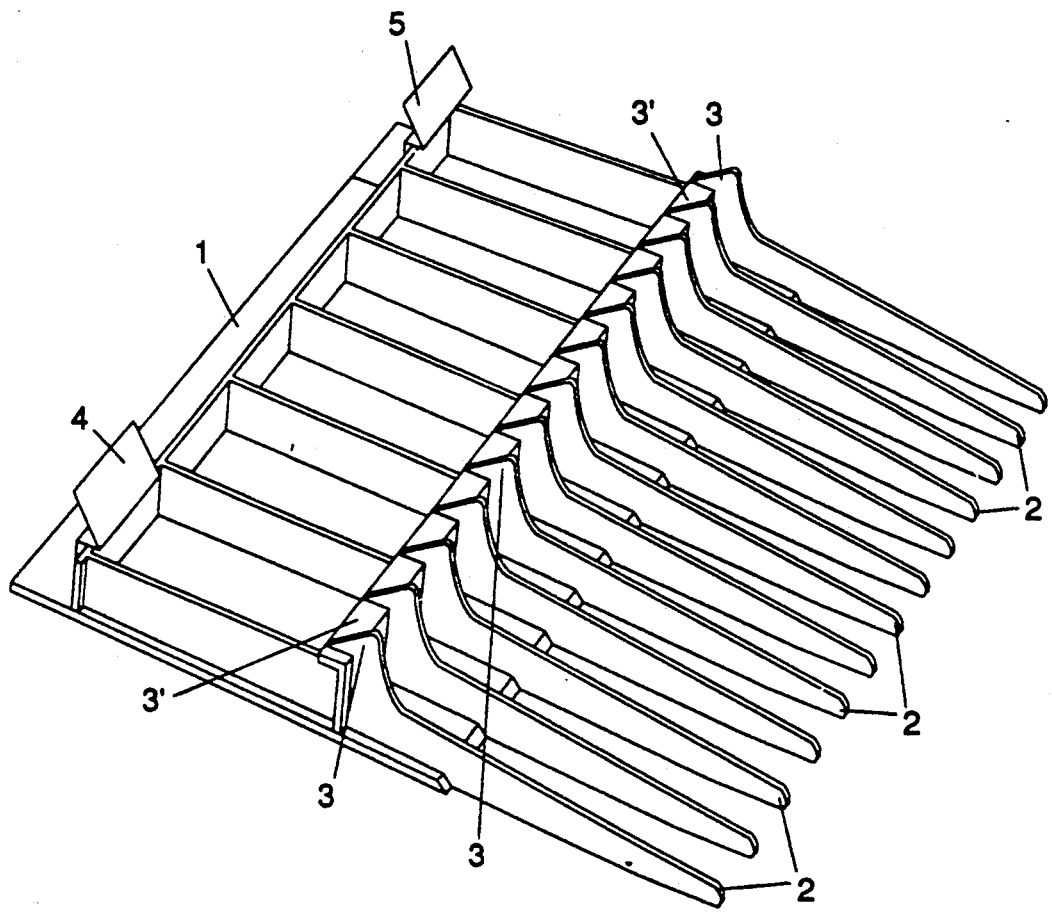
FIG. 1 is a perspective view of the underside of the comb-shaped element according to the invention.
Figure 2:
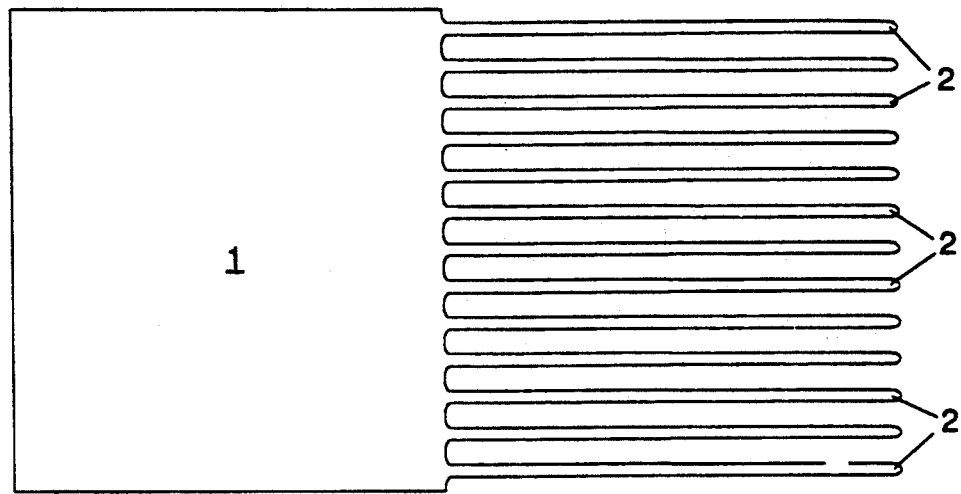
FIG. 2 is a partial top plan view of the comb-shaped element.

FIGS. 1 and 2 show a comb-shaped element for receiving, from a conveyor, in particular a chain mat, products supplied by that mat. The comb-shaped element comprises a body 1 with a closed top surface and a plurality of teeth 2, which are intended to engage between upright ribs of the chain mat. Formed on the underside of the body 1, in line with the teeth 2, are hook-shaped elements 3, these elements 3, together with the intervening connecting ribs 3', forming a rigid hook-shaped stop element extending over the entire width of the comb-shaped element. Obviously, however, it is also possible to arrange hook-shaped stop means in line with only a predetermined number of teeth or a predetermined number of groups of teeth, so that a number of hook segments are formed. Further, it is possible not to form the stop elements as one whole with the teeth and the rest of the comb-shaped element, for instance by injection molding, but to provide a separate hook or hooks on the underside of the comb-shaped element.

According to the exemplary embodiment, on the side of the comb-shaped element remote from the free ends of the teeth 2, two resilient hook-shaped retaining elements 4 and 5 are provided on the undersurface of the body 1. For these retaining elements, too, it applies that there may be more than two, or it may optionally be one wide element, and that, depending on the material chosen for the comb-shaped element, these hook-shaped retaining elements can optionally be formed in one injection molding operation together with the rest of the comb-shaped element. This last is for instance possible if the comb-shaped material is made of a relatively resilient synthetic material.

Figure 3:
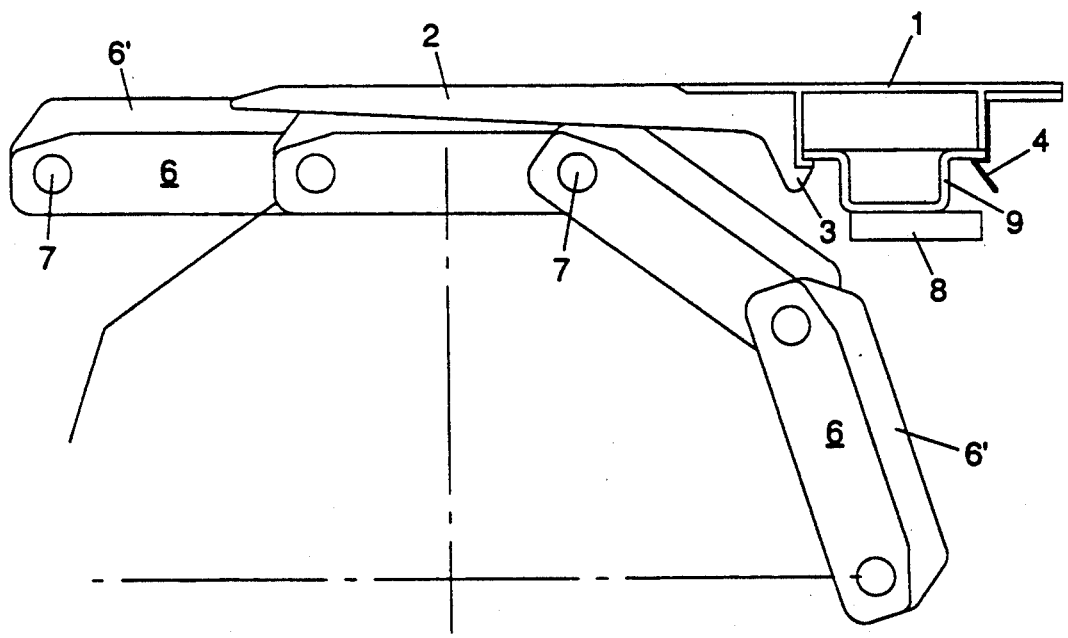
FIG. 3 is a schematic side view of the comb-shaped element in mounted condition as well as a side view of a part of a chain mat conveyor.

FIG. 3 schematically shows a plurality of members 6 of a chain mat, for instance a chain mat of the type shown in U.S. Pat. No. 4,051,949, which members 6 are coupled with each other by means of shafts 7 for rotation in the plane of the chain mat. The teeth 2 of the comb-shaped element, at the point where the chain mat is guided to the return path via a chain wheel, engage between the upright ribs 6' of the chain mat members 6 to transfer products supplied over the transport surface of this chain mat to the body 1 of the comb-shaped element and thence to any further processing-stations. The frame of the conveyor, schematically designated by the reference numeral 8, carries an attachment element 9 for the comb-shaped element. According to the exemplary embodiment, the element 9 is a U-shaped section extending under a plurality of comb-shaped elements arranged side by side across the width of the conveyor, the upper ends of the legs of the U being laterally flanged in outward direction. The free ends of these laterally bent legs are engaged, on the one hand by the stop element consisting of the hook-shaped elements 3 and, on the other hand, by the hook-shaped retaining elements 4 and 5. Obviously, various other designs are possible for elements mounted on the frame of a conveyor, which the hooks of the comb-shaped element can engage to maintain it in the proper position relative to the chain mat. For the sake of completeness, it is observed in this connection that in the present application the term "hook" is understood to include any rib-shaped or projection-like element that is capable of cooperating with a construction element mounted on the frame of a conveyor to block a movement of the comb in the direction of transport of the conveying mat and in a direction perpendicular to the plane of that mat in upward direction.

It will be clear that the comb-shaped element according to the invention has many advantages over the comb-shaped elements used heretofore. Thus, the comb-shaped element can easily shift over the attachment section 9 in a lateral direction, i.e., in a direction perpendicular to the plane of the paper in FIG. 3 when the modules of which the chain mat is made up expand or shrink as a result of temperature variations, so that the forcing of the teeth in lateral direction no longer occurs. Further, any damaged comb-shaped elements can easily and quickly be replaced by bending the resilient hook-shaped elements 4 and 5 and shifting the comb-shaped elements in the direction of the chain mat. As a result, the rigid hook-shaped elements 3 become clear of the section 9 and the comb-shaped elements can be removed. The fitting of a new comb-shaped element is effected in a comparable simple manner. Finally, the top surface of the body 1 of the comb-shaped element can be of entirely closed design and be completely smooth, whereby soiling is optimally prevented.

We claim:

1. A comb-shaped element for receiving products supplied by a conveying mat of a conveyor, said comb-shaped element comprising a body (1) with an essentially closed top surface and plurality of teeth (2) formed on the body and extending parallel to each other, characterized in that on the undersurface of the body of the comb-shaped element, adjacent the end of the teeth that bounds the body, a stop element (3) is provided and that a retaining element (4, 5) is provided opposite the stop element, likewise on the undersurface of the body, the stop element (3) comprising a hook-shaped part extending transversely to the longitudinal direction of the teeth and the retaining element comprising a resilient element, the stop element (3) and the retaining element (4, 5) being capable of resiliently co-operating with an attachment element (9) mounted on the frame of the conveyor in order to fixedly secure the comb-shaped element.

2. A comb-shaped element according to claim 1, characterized in that the stop element (3) is rigid and that the retaining element (4, 5) comprises a hook-shaped part which is made of a resilient material, the hook-shaped part being capable of being bent away in a direction away from the hook-shaped part of the stop element (3).

3. A comb-shaped element according to claim 1, characterized in that the retaining element (4, 5) and the stop element (3) form one whole with the comb-shaped element.

4. A comb-shaped element according to claim 1, characterized in that the stop element (3) forms one whole with the comb-shaped element and that the retaining element (4, 5) comprises at least one resilient lug.

5. A comb-shaped element according to claim 4, characterized in that the stop element (3) extends across the entire width of the comb-shaped element.

6. A comb-shaped element according to claim 4, characterized in that the comb-shaped element is made of a relatively brittle synthetic material.

7. A comb-shaped element according to claim 2 characterized in that the retaining element and the stop element form one whole with the comb-shaped element.

8. A comb-shaped element according to claim 2 characterized in that the stop element forms one whole with the comb-shaped element and that the retaining element comprises at least one resilient lug.

9. A comb-shaped element according to claim 8 characterized in that the stop element extends across the entire width of the comb-shaped element.

10. A comb-shaped element according to claim 8 characterized in that the comb-shaped element is made of a relatively brittle synthetic material.

11. A comb-shaped element according to claim 5 characterized in that the comb-shaped element is made of a relatively brittle synthetic material.

12. A comb-shaped element according to claim 9 characterized in that the comb-shaped element is made of a relatively brittle synthetic material.

* * * * *